(12) United States Patent
Jia et al.

(10) Patent No.: US 9,609,361 B2
(45) Date of Patent: Mar. 28, 2017

(54) METHOD FOR FAST 3D VIDEO CODING FOR HEVC

(71) Applicant: Beijing University of Technology, Beijing (CN)

(72) Inventors: Kebin Jia, Beijing (CN); Huan Dou, Beijing (CN)

(73) Assignee: Beijing University of Technology, Beijing (CN)

( * ) Notice: Subject to any disclaimer, the term of this patent is extended or adjusted under 35 U.S.C. 154(b) by 26 days.

(21) Appl. No.: 14/889,559

(22) PCT Filed: Dec. 6, 2014

(86) PCT No.: PCT/CN2014/093204
§ 371 (c)(1),
(2) Date: Nov. 6, 2015

(87) PCT Pub. No.: WO2016/078162
PCT Pub. Date: May 26, 2016

(65) Prior Publication Data
US 2016/0353129 A1    Dec. 1, 2016

(30) Foreign Application Priority Data
Nov. 23, 2014  (CN) .......................... 2014 1 0671188

(51) Int. Cl.
*H04N 19/597*    (2014.01)
*H04N 19/147*    (2014.01)
(Continued)

(52) U.S. Cl.
CPC ........... *H04N 19/597* (2014.11); *H04N 19/14* (2014.11); *H04N 19/147* (2014.11);
(Continued)

(58) Field of Classification Search
CPC ..................................................... H04N 19/597
(Continued)

(56) References Cited

U.S. PATENT DOCUMENTS

| 2014/0168362 A1* | 6/2014 | Hannuksela | ....... H04N 13/0048 348/43 |
| 2014/0267605 A1* | 9/2014 | Thirumalai | ........ H04N 13/0048 348/43 |

(Continued)

FOREIGN PATENT DOCUMENTS

| CN | 101729891 A | 6/2010 |
| CN | 102801996 A | 11/2012 |
| WO | WO2014166348 A1 | 10/2014 |

OTHER PUBLICATIONS

3D High efficiency video Coding for Multi-view video and depth data; Muller; Set-2013.*

(Continued)

*Primary Examiner* — William C Vaughn, Jr.
*Assistant Examiner* — Luis Perez Fuentes
(74) *Attorney, Agent, or Firm* — Tian IP & Technology, LLC.

(57) ABSTRACT

The present disclosure relates to the technical field of video coding. Implementations herein provide methods for fast 3D video coding for high efficiency video coding HEVC. The methods speed up the view synthesis process during the rate distortion optimization for depth coding based on texture flatness. The implementations include extracting coding information from textures, analyzing luminance regularity among pixels from flat texture regions based on statistical method, judging the flat texture regions using the luminance regularity for depth maps and terminating the flat texture block's view synthesis process when processing rate distortion optimization. Compared to original pixel-by-pixel ren- (Continued)

dering methods, the implementations reduce coding time without causing significant performance loss.

3 Claims, 6 Drawing Sheets

(51) Int. Cl.
| | |
|---|---|
| *H04N 19/186* | (2014.01) |
| *H04N 19/176* | (2014.01) |
| *H04N 19/182* | (2014.01) |
| *H04N 19/159* | (2014.01) |
| *H04N 19/14* | (2014.01) |

(52) U.S. Cl.
CPC ......... *H04N 19/159* (2014.11); *H04N 19/176* (2014.11); *H04N 19/182* (2014.11); *H04N 19/186* (2014.11)

(58) Field of Classification Search
USPC ........................................................ 375/240
See application file for complete search history.

(56) References Cited

U.S. PATENT DOCUMENTS

| | | | | |
|---|---|---|---|---|
| 2015/0030087 | A1* | 1/2015 | Chen | ................. H04N 13/0048 375/240.27 |
| 2015/0382019 | A1* | 12/2015 | Chen | .................... H04N 19/597 348/43 |
| 2016/0073132 | A1* | 3/2016 | Zhang | .................. H04N 19/597 375/240.12 |
| 2016/0100190 | A1* | 4/2016 | Zhang | .................. H04N 19/597 348/43 |
| 2016/0212446 | A1* | 7/2016 | Liu | ....................... H04N 19/597 |

OTHER PUBLICATIONS

Fast Bi-partition mode selection for 3D HEVC depth intra coding; Gu.*

Muller. K., Schwarz. H., Marpe. D., Bartnik. C., Bosse. S., Brust. H., Hinz. T., Lakshman. H., Merkle. P., Rhee. F.H., Tech. G., Winken. M., Wiegand. T., "3D High-Efficiency Video Coding for Multi-View Video and Depth Data," IEEE Transactions on Image Processing, vol. 22, No. 9, pp. 3366-3378, 2013.

Smolic. A, Muller. K., Dix. K., Merkle. P., Kauff. P., Wiegand. T., "Intermediate view interpolation based on multiview video plus depth for advanced 3D video systems," 15th IEEE International Conference on Image Processing, San Diego, USA, pp. 2448-2451, Oct. 2008.

Tech. G., Schwarz. H., Muller. K., Wiegand. T., "3D video coding using the synthesized view distortion change," 2012 Picture Coding Symposium (PCS), pp. 25-28, May 2012.

Dou Huan, Jia Ke-Bin. Multi-view Video Fast Mode Selection Algorithm Based on Depth Information. Computer Engineering . Jun. 30, 2014 No. 6 vol. 40.

* cited by examiner

METHOD FOR FAST 3D VIDEO CODING FOR HEVC

CROSS REFERENCE TO RELATED APPLICATION

This application is a national stage application of International application number PCT/CN2014/093204, filed Dec. 6, 2014, titled "A Method for Fast 3D Video Coding for HEVC", which claims the priority benefit of Chinese Patent Application No. 201410677118.8, filed on Nov. 23, 2014, which is hereby incorporated by reference in its entirety.

TECHNICAL FIELD

The present disclosure relates to a field of video coding technology, and more particularly to a fast view synthesis optimization method for coding of depth map for 3D-high efficiency video coding (HEVC) based on texture flatness.

BACKGROUND

Three dimensional (3D) video makes people see different scenarios with slight direction differences for their left and right eyes respectively; thus it can provide a viewing experience with depth perception compared to the conventional 2D video. At present, the common 3D video display is stereoscopic display, which provides two views of videos. With the development of multimedia technology, multi-view display becomes more and more popular in multimedia information industry due to its 3D visual perception for naked eyes. However, the increase of views will multiply the video data and in turn generate a great burden to the transmission and storage. An effective coding strategy needs to solve these problems. The up-to-date 2D video coding standard is the High Efficiency Video Coding (HEVC) standard and was officially approved in 2013. Meanwhile, 3D video coding standardization has been in progress.

Figure 1:
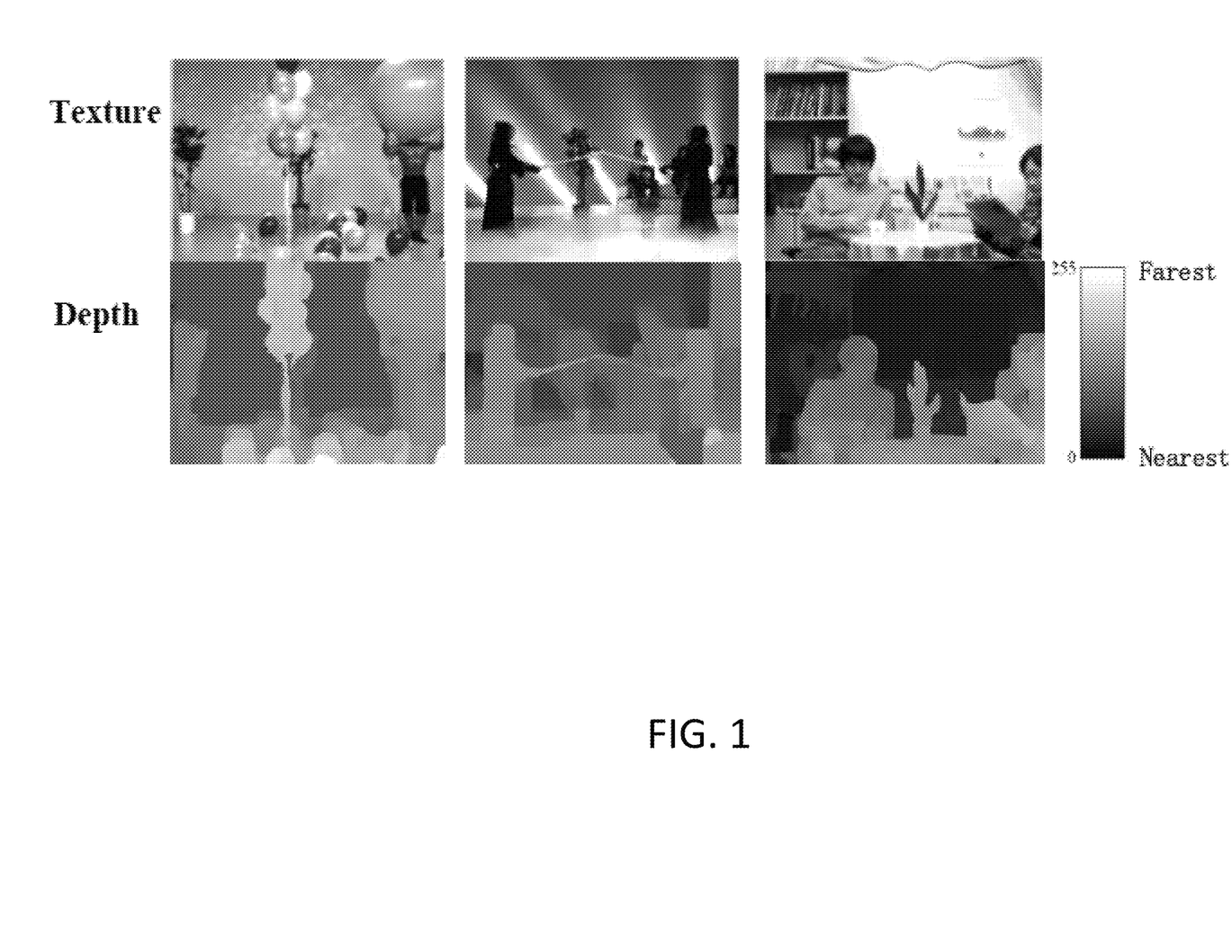
FIG. 1 is a schematic diagram of Multi-view plus depth (MVD) format.

Multi-view plus depth (MVD) format in 3D-HEVC includes two or three texture videos and their corresponding depth maps, as shown in FIG. 1. Depth maps can be seen as a set of greyscale image sequences and the luminance component is used to denote the depth value. Therefore, depth maps can effectively present the object location in the three dimensional space. With depth values, depth image based rendering (DIBR) technology can be applied to synthesize virtual views between the original two or three views and can effectively solve the large data problems due to the increase of the views.

Conventional video coding methods use rate distortion optimization techniques to make decision for the motion vector and mode selection process by choosing the vector or mode with the least rate distortion cost. The rate distortion cost is calculate by $J=D+\lambda \cdot R$, where J is the rate distortion cost, D is the distortion between the original data and the reconstructed data, $\lambda$ is the Lagrangian multiplier, and R is the number of bits used. D is usually measured by calculating the sum of squared differences (SSD) or the sum of absolute differences (SAD) between the original data and reconstructed data of current video. While depth maps are only used to synthesize virtual views and cannot be seen by the audiences directly, it may not achieve the satisfactory coding results using the conventional video coding method for depth maps. The distortion measure for depth maps need to also consider distortions in the synthesized intermediate views.

Figure 2:
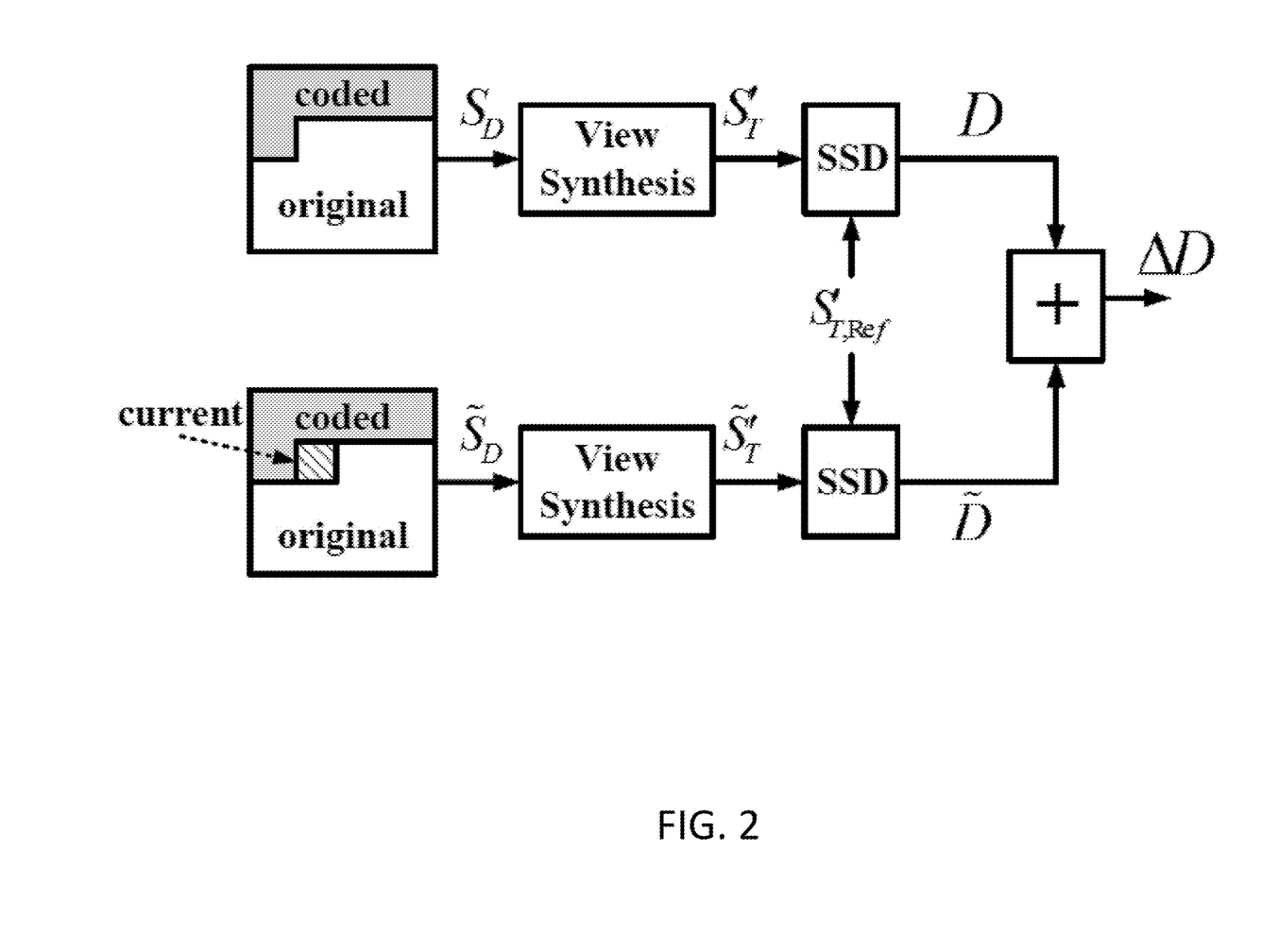
FIG. 2 is a schematic diagram of Synthesized View Distortion Change (SVDC) calculation.

In 3D-HEVC, Synthesized View Distortion Change (SVDC) is used as the distortion calculation metric for rate distortion optimization in depth coding. SVDC defines the distortion difference between two synthesized textures, as shown in FIG. 2. $S'_{T,Ref}$ denotes a reference texture rendered by the original texture and the original depth map. $S'_T$ denotes a texture rendered from the reconstructed texture and a depth map $S_D$, which is composed of the encoded depth map in encoded blocks and the original depth map in other blocks. $\tilde{S}_T$ denotes a texture rendered from the reconstructed texture and a depth map $\tilde{S}_D$ which differs from $S_D$ where it contains the distorted depth map for the current block. SSD denotes the process of calculating the sum of squared differences. Therefore, the rate distortion optimization for depth maps in 3D-HEVC includes the view synthesis process.

Figure 3:
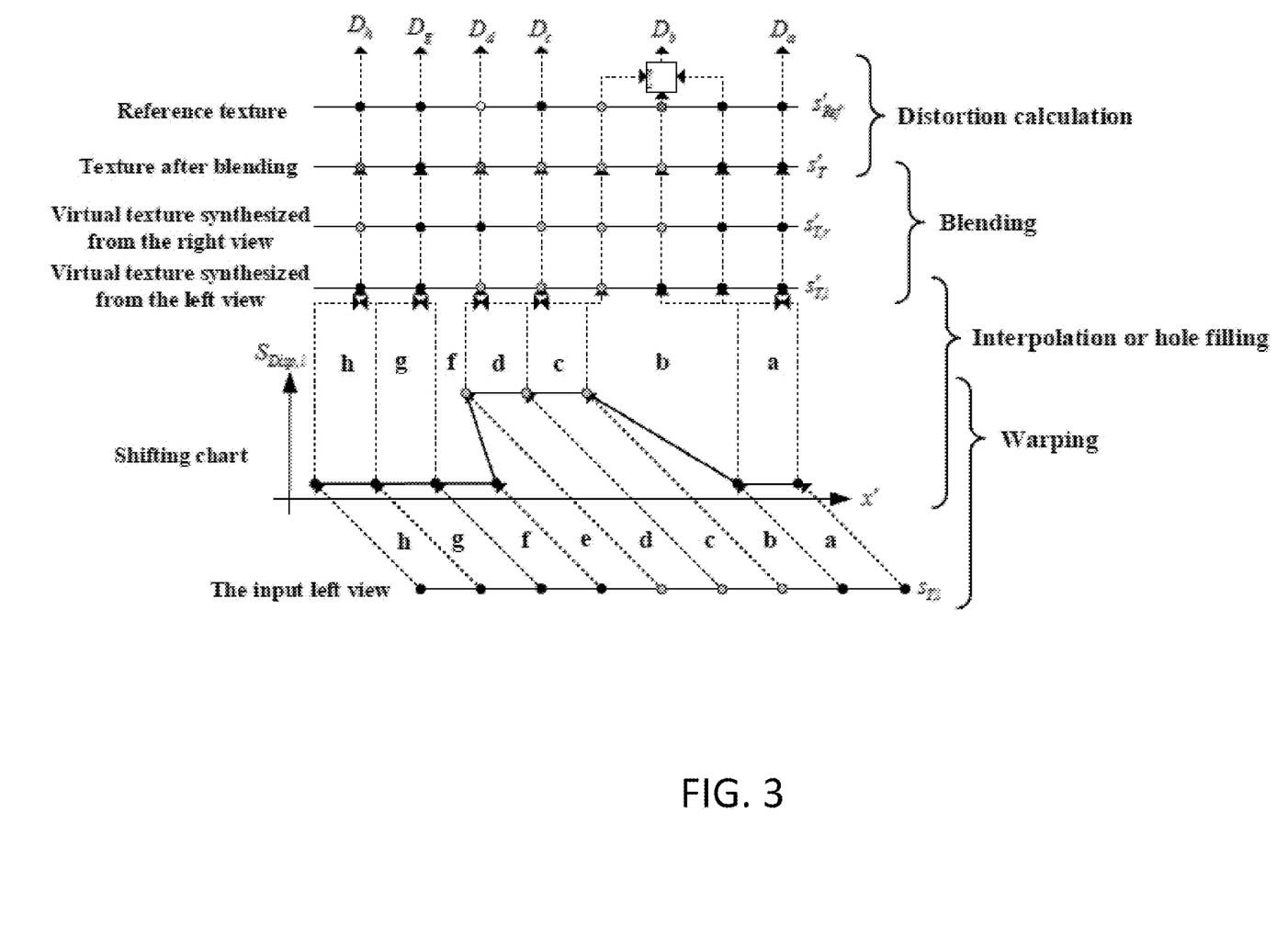
FIG. 3 is a schematic diagram of Synthesized View Distortion Change (SVDC) method.

The original SVDC method includes warping, interpolating, hole filling and blending to get the synthesized views. Then the encoder compares the two virtual views synthesized by the original depth maps and the encoded depth maps, respectively. Finally, the sum of squared differences of each synthesized pixel will be calculated. The whole process of the SVDC method is shown in FIG. 3. It brings high coding complexity due to its pixel-by-pixel rendering operation with the increase of video resolution. This present disclosure provides a fast rate distortion optimization method based on texture flatness for depth map coding in 3D-HEVC to decrease the coding complexity and basically maintain the quality of synthesized views.

SUMMARY

The present disclosure provides a method for fast 3D video coding for HEVC, which utilizes the pixel regularity from flat texture region to set threshold. With the threshold all the flat regions in depth maps can be judged and the view synthesis process of pixels from these flat regions can be skipped to speed up the view synthesis process in rate distortion optimization and reduce the coding complexity.

The present disclosure includes the following schemes in order to resolve technical problems noted above.

(1.1) Coding information are extracted from the coded textures, including the block size (n×n), the coding mode (Mode) and each pixel luminance value in reconstructed blocks (Y);

(1.2) The luminance regularity among pixels from flat texture regions is analyzed. Using the information obtained in step (1.1), blocks whose Mode types are IntraDC are regarded as flat texture blocks. Then all the sizes and the pixel luminance values of these blocks are recorded and the luminance regularity among pixels from these blocks are analyzed based on statistical method to set threshold T;

(1.3) During the view synthesis process of rate distortion optimization for depth map coding, the threshold T obtained in step (1.2) is used to divide the current depth block into l flat lines and m non-flat lines;

(1.4) Using the division results obtained in step (1.3), the view synthesis process for pixels in flat lines is terminated to decrease the high coding complexity due to the pixel-by-pixel rendering process.

The statistical method used to analyze the pixel regularity and to set the threshold in step (1.2) in this present disclosure is realized by the following schemes.

(2.1) The average luminance value of pixels in flat texture blocks is calculated by $$\tilde{Y} = \frac{1}{n \times n} \sum_i^n \sum_j^n Y_{i,j},$$

where $\tilde{Y}$ denotes the average pixel luminance value, i and j denote the pixel coordinates, n×n denotes the block size, and Y denotes the pixel luminance value;

(2.2) The average difference of pixels in flat texture blocks is calculated by $$A = \frac{1}{n \times n} \sum_i^n \sum_j^n |Y_{i,j} - \tilde{Y}|,$$

where A denotes the average difference, $\tilde{Y}$ denotes the average pixel luminance value, i and j denote the pixel coordinates, n×n denotes the block size, and Y denotes the pixel luminance value;

(2.3) For each testing sequences {newspaper, balloons, kendo, gtfly, undodancer, poznanstreet}, all the flat texture blocks are used to calculate A values by step (2.2). Then these A values are averaged and rounded down to set the threshold T.

The division process used to judge the flat texture lines in step (1.3) in the present disclosure is realized by the following schemes.

(3.1) For each line of current depth block, the absolute value of the luminance differences between neighboring pixels is calculated by $\Delta Y = |Y_p - Y_q|$, where $\Delta Y$ denotes the absolute value of the luminance differences, Y denotes the pixel luminance value, p and q denote the neighboring two pixels' abscissa values of the current line;

(3.2) If all the pixels in the line satisfied the condition where the difference $\Delta Y$ between neighboring pixels are all less than the threshold T, this line could be regarded as a flat line. Otherwise, this line would be regarded as a non-flat line.

DETAILED DESCRIPTION OF THE PREFERRED EMBODIMENTS

The following steps describe this disclosure, but don't limit the coverage of the disclosure.

Figure 4:
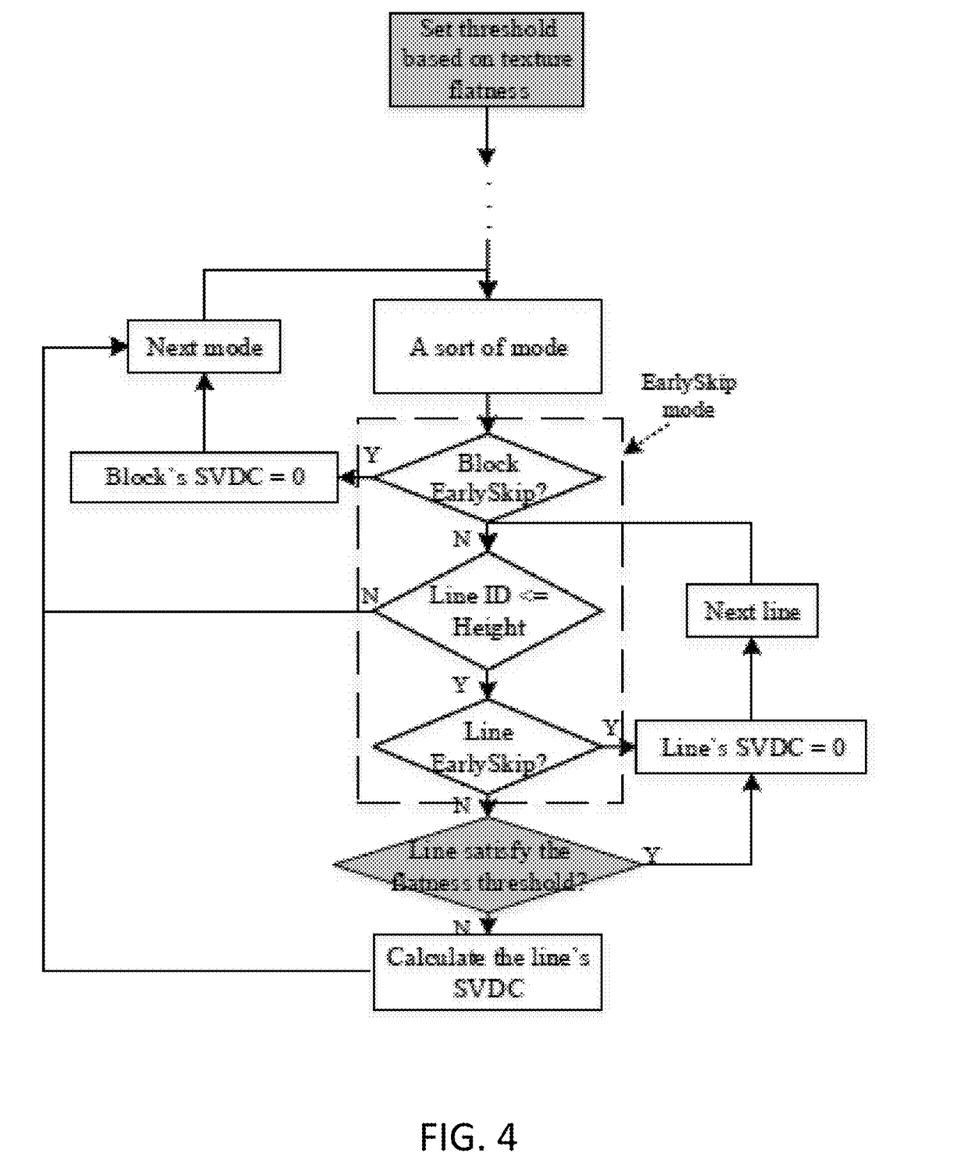
FIG. 4 is a schematic diagram of implementations herein.

This disclosure includes a fast view synthesis scheme during rate distortion optimization for depth map coding in 3D-HEVC. The procedure of this disclosure is shown in FIG. 4. The original 3D-HEVC encoder is used to encode the testing sequences {newspaper, balloons, kendo, gtfly, undodancer, poznanstreet}. During the encoding process the coding information are extracted and recorded into TXT files. The method mentioned in this disclosure is then adopted to accomplish the fast coding for 3D videos.

The specific implantation is realized by the following steps.

Step (1), coding information are extracted from the TXT files, including the size of the block (n×n), the coding mode of the block (Mode) and the luminance value of pixels in the reconstructed block (Y);

Step (2), the luminance regularity among pixels from the flat texture regions is analyzed. Using the coding information extracted by Step (1), blocks whose Mode types are IntraDC are regarded as flat texture blocks. The n×n sizes of these blocks and all pixels' reconstructed luminance values Y are then recorded. The luminance regularity among pixels from these blocks are analyzed based on statistical method and are used to set the threshold T, as shown by the following steps.

Step (2.1), the average luminance value of pixels in flat texture blocks is calculated by $$\tilde{Y} = \frac{1}{n \times n} \sum_i^n \sum_j^n Y_{i,j},$$

where $\tilde{Y}$ denotes the average pixel luminance value, i and j denote the pixel coordinates, n×n denotes the block size, and Y denotes the pixel luminance value.

Step (2.2), the average difference of pixels in flat texture blocks is calculated by $$A = \frac{1}{n \times n} \sum_i^n \sum_j^n |Y_{i,j} - \tilde{Y}|,$$

where A denotes the average difference, i and j denote the pixel coordinates, n×n denotes the block size, $\tilde{Y}$ denotes the average pixel luminance value and Y denotes the pixel luminance value.

Step (2.3), the average difference A is calculated by step (2.2) for each flat texture block from each of the testing sequences {newspaper, balloons, kendo, gtfly, undodancer, poznanstreet}. Then these A values are averaged and rounded down to set the threshold T.

Step (3), during the view synthesis process of rate distortion optimization for depth map coding, the threshold T obtained in step (2) is used to divide the current depth block into l flat lines and m non-flat lines, as shown in the following steps.

Step (3.1), for each line of current depth block, the absolute value of the luminance differences between neighboring pixels is calculated by $\Delta Y = |Y_p - Y_q|$, where $\Delta Y$ denote the absolute value of the luminance differences, Y denotes the pixel luminance value, p and q denote the neighboring two pixels' abscissa values of the current line.

Step (3.2), if all the pixels in the line satisfied the condition where the difference $\Delta Y$ between neighboring pixels are all less than the threshold T, this line could be seen as a flat line. If the condition is not satisfied, this line will be seen as a non-flat line.

Step (4), using the division results obtained in step (3), the view synthesis process for pixels in flat lines is terminated to decrease the high coding complexity caused by the pixel-by-pixel rendering process.

In order to evaluate the performance, the method mentioned in this disclosure is simulated and compared to the original method which utilize the pixel-by-pixel rendering process during the rate distortion optimization process. Both of the two methods are built on the 3D-HTM reference software 9.2. {newspaper, balloons, kendo, gtfly, undodancer} are testing sequences. The resolution of {newspaper, balloons, kendo} is 1024*768 and the resolution of {gtfly, undodancer} is 1920*1088. The parameters of the specific testing environment are shown in Table 1.

TABLE 1

| Sequence | Number of frames | 3-view input order | GOP | Texture QP | Depth QP | Virtual view step size |
|---|---|---|---|---|---|---|
| Balloons | 300 | 1-3-5 | 8 | 25, 30, 35, 40 | 34, 39, 42, 45 | 0.25 |
| Kendo | 300 | 1-3-5 | 8 | 25, 30, 35, 40 | 34, 39, 42, 45 | 0.25 |
| Newspaper | 300 | 2-4-6 | 8 | 25, 30, 35, 40 | 34, 39, 42, 45 | 0.25 |
| GTFly | 250 | 9-5-1 | 8 | 25, 30, 35, 40 | 34, 39, 42, 45 | 0.25 |
| UndoDancer | 250 | 1-5-9 | 8 | 25, 30, 35, 40 | 34, 39, 42, 45 | 0.25 |

Figure 5:
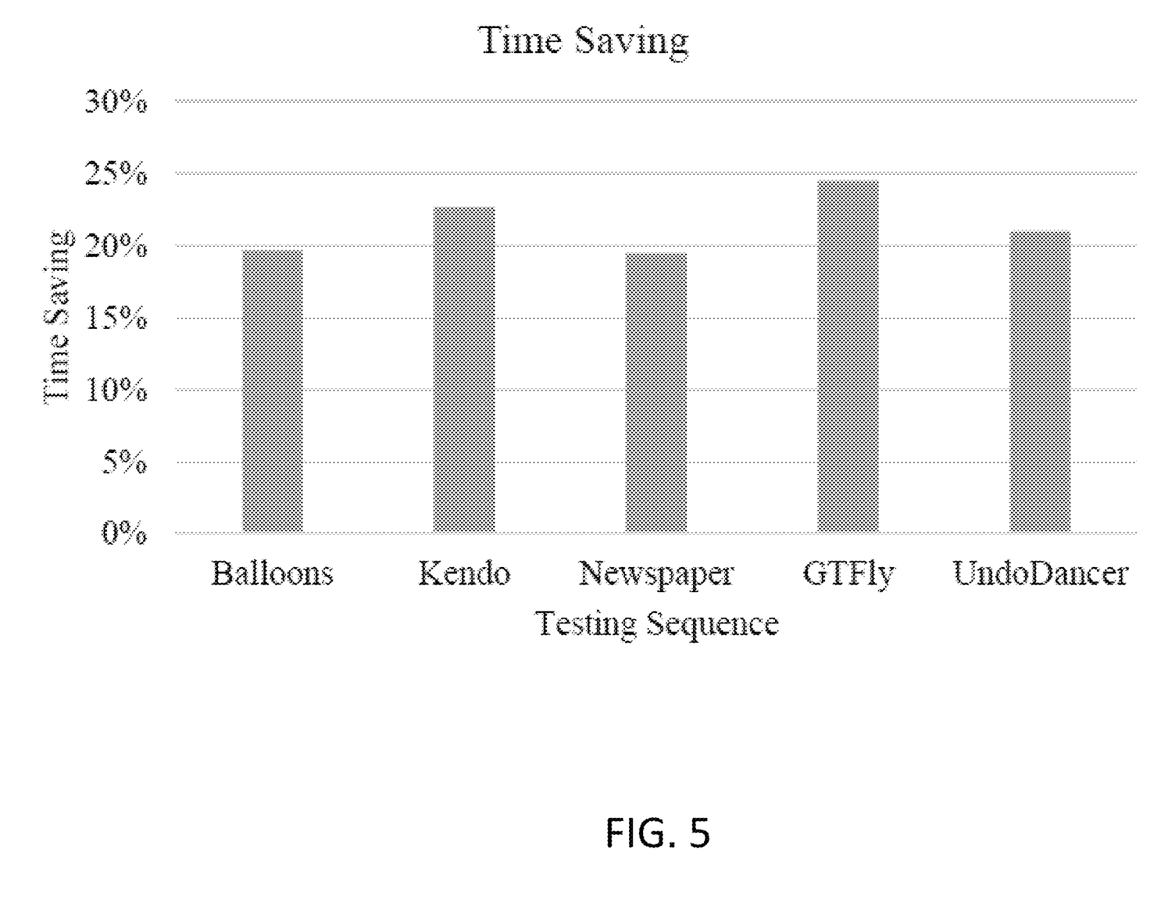
FIG. 5 is a schematic diagram of the time saving of implementations herein as compared to conventional techniques.
Figure 6:
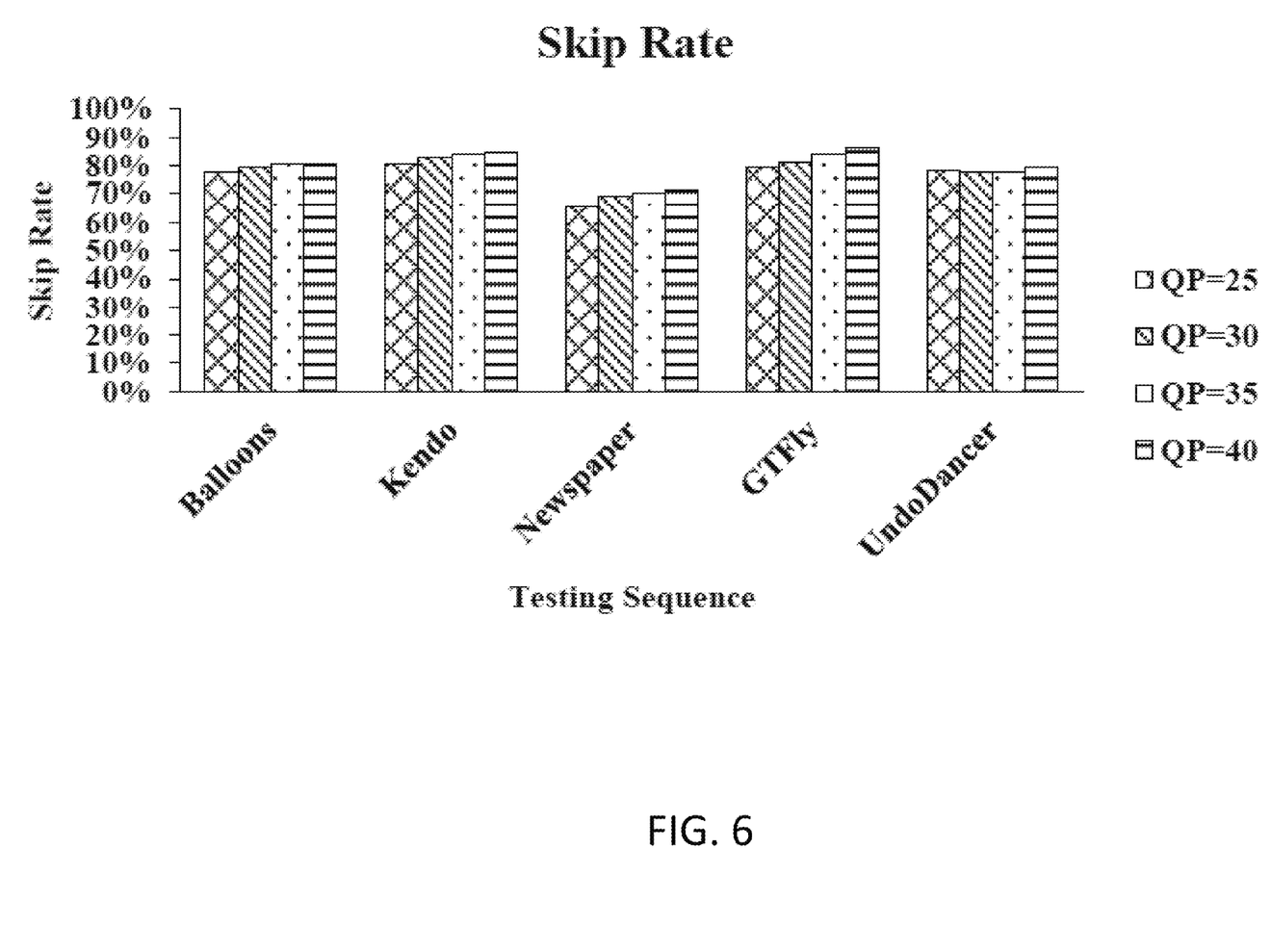
FIG. 6 is a schematic diagram of the skip rate of implementations herein.

As compared to conventional techniques, coding quality performance of the present disclosure is shown in Table 2. As compared to the conventional techniques, the present disclosure saves time and skips rates, as illustrated in FIG. 5 and FIG. 6. It can be observed that the method mentioned in the present disclosure can save above 20% coding time as compared to the original full pixel rendering method. Further, the present disclosure can basically maintain the virtual views' quality with only 0.4% of the bitrate increase.

TABLE 2

| | Coding performance | | |
|---|---|---|---|
| | BD-RATE (%) | | |
| Sequence | Base views | Synthesized views | All views |
| Balloons | 0.0 | 0.2 | 0.1 |
| Kendo | 0.0 | 0.6 | 0.3 |
| Newspaper | 0.0 | 1.6 | 1.0 |
| GTFly | 0.0 | 0.1 | 0.1 |
| UndoDancer | 0.0 | 0.9 | 0.7 |
| Average | 0.0 | 0.7 | 0.4 |

What is claimed is:

1. A method for high efficiency video coding (HEVC) 3D video coding, the method comprising:
    (1.1) extracting coding information from coded textures, the coding information including a block size represented by n×n, a coding mode represented by Mode and an individual pixel luminance value in reconstructed blocks represented by Y;
    (1.2) analyzing luminance regularity among pixels from flat texture regions, selecting blocks of which the Mode is IntraDC as flat texture blocks using the coding information obtained in step (1.1), storing sizes and pixel luminance values of the flat texture blocks, and analyzing the luminance regularity among the pixels from the flat texture blocks based on a predetermined statistical method to set a threshold represented by T;
    (1.3) dividing a current depth block into l flat lines and m non-flat lines using the threshold T obtained in step (1.2) during a view synthesis process of rate distortion optimization for depth map coding to obtain flat line and non-flat line division results; and
    (1.4) terminating the view synthesis process for the pixels in flat lines and decreasing high coding complexity caused by a pixel-by-pixel view synthesis process using the division results obtained in step (1.3).

2. The method of claim 1, wherein the analyzing the luminance regularity among the pixels from the flat texture blocks based on the predetermined statistical method to set the threshold T comprises:
    (2.1) calculating an average luminance value of the pixels in the flat texture blocks using equation 1:

$$\overline{Y} = \frac{1}{n \times n} \sum_{i}^{n} \sum_{j}^{n} Y_{i,j}, \qquad \text{(equation 1)}$$

wherein $\tilde{Y}$ denotes the average pixel luminance value, i and j denote the pixel coordinates, n×n denotes the block size, and Y denotes pixel luminance values;
    (2.2) calculating an average difference of the pixels in the flat texture blocks using equation 2:

$$A = \frac{1}{n \times n} \sum_{i}^{n} \sum_{j}^{n} |Y_{i,j} - \overline{Y}|, \qquad \text{(equation 2)}$$

wherein A denotes the average difference, $\tilde{Y}$ denotes the average pixel luminance value, i and j denote the pixel coordinates, n×n denotes the block size, and Y denotes pixel luminance values; and
    (2.3) calculating A values using equation 2 for the flat texture blocks in individual testing sequences {newspaper, balloons, kendo, gtfly, undodancer, poznanstreet}, averaging the A values to obtain an average value, and rounding down the average value to set the threshold T.

3. The method of claim 1, wherein the flat line and non-flat line division results are obtaining by:
    calculating an absolute value of the luminance differences between neighboring pixels for an individual line of the current depth block using equation 3:

$$\Delta Y = |Y_p - Y_q| \qquad \text{(equation 3)},$$

wherein $\Delta Y$ denotes the absolute value of the luminance differences, Y denotes the pixel luminance value, p and q denote the neighboring two pixels' abscissa values of a current line;
    in response to a determination that pixels in the line satisfy the condition that the difference $\Delta Y$ between neighboring pixels are less than the threshold T, determining that the line is a flat line; and
    in response to a determination that the pixels in the line do not satisfy the condition that the difference $\Delta Y$ between neighboring pixels are less than the threshold T, determining that the line is a non-flat line.

* * * * *